United States Patent [19]

Runavot et al.

[11]  4,412,030
[45]  Oct. 25, 1983

[54] HOT MELT ADHESIVE COMPOSITIONS EMPLOYING RESINS BASED ON 2-METHYL STYRENE, STYRENE AND A PHENOL

[75] Inventors: Yves Runavot, St. Maur des Fosses; Georges Billault, Saint Quen; Jaques Salvetat, Le Vesinet, all of France

[73] Assignee: National Starch and Chemical Corporation, Bridgewater, N.J.

[21] Appl. No.: 373,585

[22] Filed: Apr. 30, 1982

Related U.S. Application Data

[63] Continuation-in-part of Ser. No. 191,466, Aug. 25, 1980, Pat. No. 4,357,459.

[51] Int. Cl.$^3$ .......................................... C08L 101/06
[52] U.S. Cl. ................................... 524/505; 156/327; 524/202; 524/286; 524/488; 524/489; 524/508; 525/149
[58] Field of Search ............... 524/310, 505, 313, 508, 524/474, 488, 478, 489, 575.5; 525/139, 140, 143, 145, 149

[56] References Cited

U.S. PATENT DOCUMENTS 2,502,003  3/1950  Geiger ................................ 528/205
4,127,545  11/1978  Callan ................................ 525/149

FOREIGN PATENT DOCUMENTS 54-150492  11/1979  Japan ................................ 528/205

*Primary Examiner*—C. A. Henderson
*Attorney, Agent, or Firm*—Edwin M. Szala; Ellen T. Dec

[57] ABSTRACT

Resins suitable for adhesives are based on α-methyl styrene, styrene and phenol in certain percentages, viz. 25 to 63, 35 to 73 and 2 to 15 percent by weight, respectively.

Combinations of resin, ethylene vinyl acetate copolymer, atactic polypropylene, ethyl acrylate copolymer or a thermoelastomer and optionally a wax or tackifying oil yield excellent adhesives, in particular hot-melt adhesives.

9 Claims, No Drawings

HOT MELT ADHESIVE COMPOSITIONS EMPLOYING RESINS BASED ON 2-METHYL STYRENE, STYRENE AND A PHENOL

BACKGROUND OF THE INVENTION

This application is a continuation-in-part of copending application, Ser. No. 191,466 filed Aug. 25, 1980, now U.S. Pat. No. 4,357,459.

1. Field of the Invention

The invention relates to resins, based on α-methyl styrene, styrene and phenol as constituents, and their application in adhesives, such as hot-melt adhesives and pressure-sensitive adhesives.

2. Description of the Prior Art

Resins based on the above constituents are known in the art for various purposes. G.B. Specification No. 1,131,163 discloses water-soluble resins obtained by reacting formaldehyde and a Friedel-Crafts catalyzed condensation product of phenol optionally with some cresol and styrene or α-methyl styrene. This intermediate condensation product is prepared by reacting styrene (or α-methyl styrene) with an excess of phenol, i.e. 0.1-0.5 mole styrene per mole of phenol resulting in phenolic resins containing 10 to 30% by weight of styrene and 64 to 90% of phenol.

U.S. Pat. No. 3,189,569 discloses polymeric compositions containing about 65-80% by weight of vinylaryl compounds, about 20-35% by weight of acrylonitrile, less than 1% of a trisubstituted phenol and optionally less than 1% of an epoxidized compound.

U.S. Pat. No. 2,558,812 discloses resins comprising about 5-25 mole percent of phenol, about 25-45 mole percent of an aromatic hydrocarbon and 50-60 mole percent of a conjugated aliphatic diene hydrocarbon such as butadiene, isoprene or cyclopentadiene. Fr. Specification No. 7,419,993 (Nat. Reg. No. 2,232,554) and the equivalent G.B. Specification No. 1,457,356 disclose resins based on α-methylstyrene, styrene, a phenol and 5-50% by weight of isobutene, resulting in a relatively low softening point of the resins.

However, for use in hot melt and pressure-sensitive adhesives relatively high softening points, good compatibility with natural or synthetic elastomers, satisfactory peel strength, shear adhesion and tack are required.

The resins according to the present invention possess a good combination of properties satisfying the above requirements and also show improved compatibility with ethylene-vinyl acetate copolymers, atactic polypropylene and ethylacrylate copolymers.

SUMMARY OF THE INVENTION

It has now been found that certain resins useful in adhesives, in particular hot-melt pressure-sensitive adhesives, are based on a mixture of α-methyl styrene, styrene and a phenol as the sole constituents, in such a way that the resin consists of 25-63% by weight of α-methyl styrene, 35-73% by weight of styrene and 2-15% by weight of a phenol. These percentages add up to 100 or substantially 100, because technical grade constituents may contain minor impurities. For instance, technical grade α-methyl styrene typically is more than 98% pure, the impurities being aromatic solvents and styrene. Technical grade styrene typically has a purity of more than 99%, the main impurities being aromatic solvents. Certain technical grades, containing these starting materials together with non-polymerisable aromatic solvents, may however also be used yielding a resin consisting for more than 98% of above constituents.

DESCRIPTION OF THE PREFERRED EMBODIMENTS

In a preferred embodiment of the invention the resin consists of 25-57% by weight of α-methyl styrene, 40-72% by weight of styrene and 3-10% by weight of phenol.

The α-methyl styrene, the styrene and a phenol, which may have the structural formula

in which R represents hydrogen or a $C_1$-$C_{12}$ alkyl group, preferably a $C_6$-$C_{10}$ alkyl group, can be used in the form of technical grade compounds (purity above 95%). Depending on the nature and reactivity, some of these impurities may be built into the resin. Those resins are preferred which comprise a combination of a phenol and a $C_6$-$C_{10}$ monoalkyl phenol such as e.g. octyl phenol, for use in adhesives.

The resins according to the invention usually show softening points (Ring & Ball according to ASTM E28) of about 70° to 120° C., unless high amounts of phenol and/or α-methyl styrene with respect to styrene are used. The compatibility with elastomers, such as natural and synthetic rubbers, is excellent, giving typical cloud points below 30° C. and yielding clear mixtures. The average molecular weight of these resins ranges from about 400 to 2,000.

The resins according to the present invention can be prepared by reacting, optionally in the presence of a hydrocarbon solvent e.g. methylcyclohexane or toluene, the desired amounts of starting materials and a small amount of a Friedel-Crafts type catalyst, for instance $BF_3$, $AlCl_3$, $TiCl_4$ or a complex thereof with e.g. ether or phenol, and keeping the reaction temperature between 0° and 80° C., preferably between 20° and 50° C.

Slow addition of the catalyst—which is preferably $BF_3$ or a complex thereof—may be recommendable in view of the exothermic nature of the reaction. Special measures to control the temperature during the reaction may be required to secure satisfactory and reproducible technical results. The reaction mixture is kept for several hours at the desired reaction temperature (0°-80° C.), after which the catalyst is destroyed, preferably by precipitating with an aqueous hydroxide and filtering, whereafter the volatiles e.g. solvent and any unreacted starting material, are removed.

The resins according to the present invention can advantageously be used in adhesives, more particularly in hot-melt adhesives which do not require the presence of organic solvents. The compatibility of the resin with rubber is excellent (50:50 mixtures).

In some instances elastomers like rubber and certain ethylenevinyl acetate copolymers, ethylacrylate copolymers and atactic polypropylene can be used either in combination or separately together with these resins in hot-melt pressure-sensitive adhesive formulations.

The present invention also provides pressure-sensitive adhesives which are mixtures of a resin based on α-methyl styrene, styrene and a phenol in the above-specified amounts, and an elastomer such as natural or synthetic rubber. As natural rubber crude gum can be used and as synthetic rubbers any thermo-elastomer, such as styrene butadiene styrene (SBS) and e.g. styrene isoprene styrene (SIS) block copolymers.

The resins and elastomers can be combined in weight ratios of between 0.3 to 3 parts of resin per part of rubber, preferably between 0.5 and 2. Optional further ingredients such as waxes, tackifying or plasticizing oils (usually a naphthenic oil) and stabilizer against oxidation and ultraviolet light can be incorporated in minor amounts. The particular optional ingredients used will depend, in part, on whether pressure-sensitive properties are desired. The resin and rubber are melted at a temperature ranging from about 80° to 200° C. and kept at this temperature for 10-30 minutes. Sometimes, better results are obtained by combining more than one type of rubber or more than one type of resin. The use of solvents (aliphatic or aromatic hydrocarbons, chlorinated derivatives thereof or e.g. ketones) is often superfluous, though the usual adjuncts, such as anti-oxidants, fillers and the like may be incorporated in minor amounts.

In a further embodiment the present invention provides hot-melt pressure-sensitive adhesives which comprise a mixture of ethylene vinyl acetate copolymer containing 25-65%, preferably 38% to 55% of vinyl acetate and the same hydrocarbon resin as described above, and optionally a tackifying oil. The amounts by weight of resin and copolymer can range between 35:65 and 60:40, preferably 40:60 and 50:50.

In another embodiment of the present invention non-pressure-sensitive hot-melt adhesive are provided, which comprise substantially a mixture of an ethylenevinyl-acetate copolymer containing at least 25%, and at most 55%, by weight of vinyl acetate, and a resin obtained by catalytic reaction of a mixture comprising α-methyl styrene, styrene and phenol in the mutual weight ratios as specified above, optionally with a microcrystalline and/or paraffin wax and/or a tackifying oil. The amounts by weight of resin and copolymer will also range between 35:65 and 60:40, preferably between 40:60 and 50:50.

Mixing of resin and copolymer is effected in the melt at a temperature of 150°-200° C., preferably 160°-180° C. for 15-60 minutes. Also minor quantities of antioxidants may be present. As the examples show, by this process hot-melt adhesives can be provided which are particularly suitable for packaging, bookbinding or the manufacture of disposables, such as diapers, sanitary towels and, disposable dressings.

The waxes which may be used in conjunction with the thermoelastomers or copolymer resins in order to reduce the melt viscosity or cohesive characteristics are conventional in the art and include (1) low molecular weight, e.g. 1000-6000, polyethylene having a hardness value, as determined by ASTM method D-1321, of from about 0.1 to 120 and an ASTM softening point of from 150°-250° F. (2) petroleum waxes such as paraffin wax having a melting point of from about 130° to 210° F. and microcrystalline wax having a melting point of from about 140° to 200° F., the latter melting points being determined by ASTM method D127-60; (3) atactic polypropylene having a Ball and Ring softening point of from about 120°-160° C.; and synthetic waxes made by polymerizing carbon monoxide and hydrogen such as Fischer-Tropsch wax. Each of these wax diluents is solid at room temperatures. Hydrogenated animal, fish and vegetable fats and oils such as hydrogenated tallow, lard, soya oil, cottonseed oil, castor oil, menhadin oil, cod liver oil, etc., are solid materials at ambient temperature by virtue of their being hydrogenated and are also found to be useful to function as the wax diluent equivalent. These hydrogenated materials are often referred to in the adhesive industry as "animal or vegetable waxes." Generally the wax is used in an amount of 10-50, preferably 20-40% by weight of the adhesive formulation.

The plasticizing or tackifying oils are generally used in adhesives which are formulated to be pressure sensitive. The particular oils employed include not only the usual plasticizing oils prepared from petroleum fractions but also contemplates the use of olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). The oil may be totally non-aromatic. Preferably the petroleum oils contain between about 30 and 45% naphthenic carbon atoms, between 35 and 65% by weight of paraffinic carbon atoms, the balance being aromatic carbon atoms and have number average molecular weights between about 300 and 1,400. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof. When employed, the oil is generally used at levels of 1-25, preferably 5-10%, by weight of the adhesive formulation.

The balance of the essential properties of certain adhesives, when formulated as pressure-sensitive adhesives, such as compatibility with rubber, peel strength (determined according to PSTC-1), tack (determined according to PSTC-6, modified in that the adhesive is applied in a layer of 25-50 micrometers using a hot knife) and shear adhesion (determined according to PSTC-7) is improved as compared with those resins based exclusively on α-methyl styrene, styrene, isobutene and optionally a phenol.

The adhesives according to the invention are especially useful in the manufacture of disposables, e.g. diapers and sanitary towels, tapes of various types such as e.g. packaging tapes, masking tapes for automobile windows, carpet-laying tapes, labels, floor tiles, wall coverings, automobile upholstery, etc.

The non-pressure-sensitive hot melts as formulated herein are characterized by superior adhesion, hot and cold resistance and stability and as such are suitable for packaging, bookbinding and non-pressure-sensitive disposables applications.

The invention is illustrated by the following Examples.

EXAMPLE 1

64% by weight of styrene, 34% by weight of α-methyl styrene and 2% by weight of phenol were dissolved in 60 parts by weight, calculated on monomeric starting material, of methylcyclohexane and subsequently 0.2 part by weight of $BF_3$ gas was introduced. A reaction temperature of 30°-35° C. was maintained for four hours, after which the catalyst was neutralized with sodium hydroxide and filtered, while solvent and some unreacted starting material were stripped off. A resin was obtained with a softening point of 97° C., which was soluble in polystyrene-polybutadiene-polystyrene and polystyrene-polyisoprene-polystyrene block copolymers (ratio of resin to elastomer 50:50), yielding a solution with a cloud point below 30° C. The resin was very useful for hot-melt adhesive compositions, especially for hot-melt pressure-sensitive adhesives.

EXAMPLE 2

70% by weight of styrene, 28% by weight of α-methyl styrene and 2% by weight of phenol were dissolved in 60 parts by weight of toluene, and 0.2 part by weight of $BF_3$ gas was introduced (these parts by weight are calculated on the monomeric starting material). Reaction and working-up conditions were as described in Example 1. A resin was obtained with a softening point of 85° C.

EXAMPLE 3

63.5% by weight of styrene, 31.3% by weight of α-methyl styrene and 5.2% by weight of octyl phenol were dissolved in 60 parts by weight of methyl cyclohexane, after which 0.3 part by weight of $BF_3$ gas was introduced. Reaction and working-up conditions were as described in Example 1. The resin obtained had a softening point of 85° C., was completely soluble in polystyrene-polyisoprene-polystyrene and polystyrene-polybutadiene-polystyrene block copolymers (50:50), yielding a clear solution with a cloud point below 30° C.

EXAMPLE 4

61% by weight of styrene, 32% by weight of α-methyl styrene and 7% by weight of phenol were dissolved in 80 parts of methylcyclohexane, and 0.25 part of $BF_3$ was introduced. Reaction and working-up conditions were as described in Example 1. A resin was obtained having a softening point of 80° C., which resin was fully compatible with ethylene-vinyl acetate containing 40% of vinyl acetate and with polystyrene-polybutadiene/polyisoprene-polystyrene block copolymers (50:50).

EXAMPLE 5

60% by weight of styrene, 31.5% by weight of α-methyl styrene and 8.5% by weight of phenol were dissolved in 70 parts of toluene and 0.2 part of $BF_3$ gas was introduced. Reaction and working-up conditions were as described in Example 1. The resin thus obtained showed a softening point of 70° C. and as regards compatibility it had properties equivalent to those of the resin of the preceding Example.

EXAMPLE 6

60% by weight of styrene, 31% by weight of α-methyl styrene and 9% by weight of phenol were dissolved in 70 parts by weight of toluene, calculated on the total weight of monomeric material, and 0.2 part of $BF_3$ gas was introduced. The reaction temperature was 50°–55° C., which was maintained for four hours, after which the catalyst was neutralized with an aqueous NaOH solution and was filtered off, and volatiles were stripped off. The resin thus obtained showed a softening point of 65°±5° C. and was fully compatible with an ethylene-vinyl acetate copolymer containing 40% of vinyl acetate and also with a polystyrene-polybutadiene-polyisoprene block copolymer in a weight ratio of 50:50.

EXAMPLE 7

50 parts by weight of the resin obtained according to Example 5 were mixed with 100 parts by weight of a thermoelastomer (a polystyrene-polyisoprene-polystyrene block copolymer, specific density 0.93) and 16 parts of naphthenic oil. Mixing was effected at 100° C. for 15 minutes, after adding 5 parts of zinc dibutyl dithiocarbamate. The mixture thus obtained was a useful hot-melt pressure-sensitive adhesive especially suitable for permanent labels on bottles, showing the following properties:

| peel strength | 450 g/cm |
| --- | --- |
| shear adhesion | above 24 hours |
| tack | 17 cm. |

EXAMPLE 8

30 parts by weight of the resin of Example 5, 70 parts by weight of thermoelastomer as described in Example 6, and 3 parts of zinc dibutyl dithiocarbamate were mixed at 130° C. for 15 minutes, yielding a homogeneous hot-melt pressure-sensitive adhesive, especially useful for carpet-laying tapes, the properties of the adhesive were as follows:

| peel strength | 805 g/cm |
| --- | --- |
| shear adhesion | above 25 hours |
| tack | 9 cm. |

EXAMPLE 9

120 parts by weight of the resin of Example 5, 100 parts of thermoelastomer as described in Example 6, 40 parts of naphthenic oil and 5 parts of zinc dibutyl dithiocarbamate were mixed at 100° C. for 15 minutes, yielding a pressure-sensitive adhesive, especially suitable for packaging tapes. The properties were as follows:

| peel strength | 300 g/cm |
| --- | --- |
| shear adhesion | above 24 hours |
| tack | 15 cm. |

EXAMPLES 10 AND 11

50 parts by weight of the resin of Example 5 and 50 parts by weight of an ethylene-vinyl acetate copolymer containing 40% by weight of vinyl acetate (melt index determined according to ASTM D 1238: 40–70 g/10 minutes) were mixed in the melt at a temperature of about 165° C. Thus a hot-melt pressure-sensitive adhesive was obtained which was very suitable for use in the production of diapers, sanitary towels, and the like by mixing resin and polymer in a ratio of 40:60.

The following properties were determined for 50:50 and 40:60 mixtures respectively:

| peel strength | 670 | 580 | g/cm |
| --- | --- | --- | --- |
| shear adhesion | above 24 | above 24 | hr |
| tack | 3.5 | 6.5 | cm |

EXAMPLES 12 AND 13

By the process described in Example 10 two hot-melt pressure-sensitive adhesives were prepared by mixing an amount of the resin of Example 6 with an ethylene-vinyl acetate copolymer containing 45% vinyl acetate (melt index determined according to ASTM 1238: 25 g/10 minutes). The ratios by weight of the mixture of resin and copolymer were 50:50 and 40:60. The melting/mixing temperature was 180° C. Also these hot-melt pressure-sensitive adhesives proved to be especially suitable for bonding diapers, sanitary towels and other disposables.

The following properties were determined for 50:50 and 40:60 mixtures respectively:

| peel strength | 640 | 500 | g/cm |
|---|---|---|---|
| shear strength | above 24 | above 24 | hr |
| tack | 3.6 | 6.6 | cm |

EXAMPLE 14

A standard hot-melt was prepared according to the formulation:

30 parts ethylene-vinyl acetate resin (containing 28% of vinyl-acetate)
50 parts of resin;
20 parts of microcrystalline wax (m.p. 82° C.);
0.5 parts of di tert-butyl-p cresol.

Two such compositions were evaluated and compared; in the first the resin was the resin described in Example 5, in the second it was Kristalex, a commercially available methyl styrene-styrene copolymer (no phenol) sold by Hercules Chemical Co., and having the following characteristics:

| softening point | 85° C. (R + B) |
|---|---|
| colour | water-white |
| acid value and saponification value | <1 |
| specific gravity (25° C.) | 1.06 |

Both compositions were evaluated as a hot-melt adhesive to seam polyethylene to non-wovens.

The adhesive based on the commercial resin gave poor (zippery) bonds between polyethylene and non-wovens, whereas the other adhesive according to the invention gave strong (destructive or polytearing) bonds.

We claim:

1. A hot melt adhesive composition comprising:
   (a) a first resin having an average molecular weight of 400 to 2,000, based on α-methyl styrene, styrene and a phenol as constituents, characterized in that the weight percentages of α-methyl styrene, styrene and a phenol with a structural formula

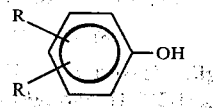

in which R is hydrogen or a $C_1$–$C_{12}$ alkyl group, which compounds are substantially the sole constituents, range from 25 to 63, from 35 to 73 and from 2 to 15 parts by weight of the resin, respectively; and
   (b) a second resin selected from the group consisting essentially of copolymers of ethylene vinyl acetate containing 25-65% vinyl acetate, atactic polypropylene, ethylacrylate copolymers, natural rubbers and synthetic rubbers.

2. The hot melt adhesive composition of claim 1 wherein the resin of part (b) is selected from the group consisting of ethylene vinyl acetate containing 25-65% vinyl acetate, atactic polypropylene and ethylacrylate copolymers and the weight ratio of the resin of (a) and the resin of (b) is within the range of 1:0.3 to 1:3.

3. The hot melt adhesive composition of claim 2 wherein the resin of (a) and the resin of (b) is within the range of 1:05 to 1:2.

4. The hot melt adhesive composition of claim 1 wherein the resin of part (b) is a copolymer of ethylene vinyl acetate containing 38-55% vinyl acetate.

5. The hot melt adhesive composition of claim 1 wherein the resin of part (b) is a natural or synthetic rubber and the weight ratio of the resin of (a) and the resin of (b) is within the range of 35:65 and 60:40.

6. The hot melt adhesive composition of claim 5 wherein the weight ratio of the resin of (a) and the resin of (b) is within the range of 40:60 and 50:50.

7. The hot melt adhesive composition of claim 1 wherein at least one wax or tackifying oil is additionally present.

8. The hot melt adhesive composition of claim 7 wherein the wax is present in an amount of 10 to 50% by weight of the composition.

9. The hot melt adhesive composition of claim 7 wherein the tackifying oil is present in an amount of 1-25% by weight of the composition.

* * * * *